United States Patent
Mullins (10) Patent No.: US 6,454,289 B1
(45) Date of Patent: Sep. 24, 2002

(54) TRAILER HITCH CART FOR A MOTORCYCLE

(76) Inventor: Raymond Mullins, 2685 N. U.S. Hwy. 45-52, Clifton, IL (US) 60927

( * ) Notice: Subject to any disclaimer, the term of this patent is extended or adjusted under 35 U.S.C. 154(b) by 0 days.

(21) Appl. No.: 09/624,462

(22) Filed: Jul. 24, 2000

(51) Int. Cl.$^7$ ................................................. B60D 1/00
(52) U.S. Cl. ...................... 280/476.1; 280/204; 280/418
(58) Field of Search ............................. 250/204, 411.1, 250/415.1, 418, 476.1; 180/209

(56) References Cited

U.S. PATENT DOCUMENTS

| | | | | |
|---|---|---|---|---|
| 3,837,677 A | * | 9/1974 | Haskins | 280/476 |
| 3,843,160 A | * | 10/1974 | Frushour | 280/415 A |
| 3,888,515 A | * | 6/1975 | Winter | 280/476 R |
| 3,930,670 A | * | 1/1976 | Haskins | 280/476 |
| 4,491,338 A | * | 1/1985 | Sheldrake | 280/405 R |
| 4,511,155 A | * | 4/1985 | Galloway | 280/204 |
| 4,536,001 A | * | 8/1985 | Wagner | 280/5 C |
| 4,548,423 A | * | 10/1985 | Craven | 280/492 |
| 4,610,457 A | * | 9/1986 | Harmon | 280/204 |
| 5,609,350 A | * | 3/1997 | Chumley | 280/476.1 |
| 5,690,361 A | * | 11/1997 | Mouri | 280/771 |
| 5,727,804 A | * | 3/1998 | Metzger | 280/476.001 |
| 5,853,057 A | * | 12/1998 | Mullins | 180/16 |
| 5,975,550 A | * | 11/1999 | Schonfeld | 280/284 |

* cited by examiner

Primary Examiner—Avraham Lerner
Assistant Examiner—L. Lum
(74) Attorney, Agent, or Firm—Marshall, Gerstein & Borun (57) ABSTRACT

A trailer hitch cart for a motorcycle comprises a two-wheel cart having a U-shaped frame, with a lateral frame member, a first longitudinal frame member extending forward from one end of the lateral frame member, and a second longitudinal frame member extending forward from the opposite end of the lateral frame member. Wheel mounting assemblies are provided at the forward ends of the respective longitudinal frame member on which the wheels on each side of the cart are mounted. The wheel mounting assemblies include rotation resisting shock absorbers connected by a crank member to the axles on which the wheels of the cart are mounted. As the wheels move up and down over the bumps in the road surface, the wheels on their axles rotate the crank members which applies rotational pressure to the shaft of the rotational type shock absorber. The shaft of each shock absorber extends into the tubular cavity of a housing which is filled with a rubber-like compressive material that is tightly adhered to the inner wall of the housing and to the shaft. When rotational pressure is applied to the shaft by the chock absorber crank in response to the slight up and down movement of the wheels over the bumps in the road surface, the compressive material adhered to the shaft resiliently resists rotation of the shaft thereby absorbing some or all of the impact of the wheels coming in contact with the bumps and depressions in the road surface. A longitudinal connecting member extends forwardly from the mid-region of the lateral frame member to connect the cart to the motorcycle, and a tubular connecting member extends rearwardly from the same location for reception therein of the shaft of a conventional trailer hitch to which a trailer can then be connected. The wheels of the cart are positioned adjacent the rear wheel of the motorcycle and outboard from each opposite side thereof when the cart is connected to the motorcycle. The cart in accordance with this invention provides a safer and more stable connection of a trailer to a motorcycle.

8 Claims, 7 Drawing Sheets

TRAILER HITCH CART FOR A MOTORCYCLE

FIELD OF THE INVENTION

This invention relates to the field of devices for hitching or connecting trailers to motorcycles in a way that improves safety and stability of the connected unit. In particular it relates to a separate two-wheel cart which is connected to the rear of the motorcycle, and the trailer is then connected to the two-wheel cart.

BACKGROUND OF THE INVENTION

Prior art methods of connecting trailers to motorcycles have not used a separate two-wheel cart as far as is known to the inventor. In the prior art, the trailer is connected directly to the rear of the motorcycle. Trailers typically have two laterally spaced apart wheels whereas the usual motorcycle has two in-line wheels spaced apart longitudinally. On curves, the motorcycle can lean into the curve without becoming de-stabilized, whereas the trailer with two laterally spaced apart wheels cannot. At higher speeds around curves the trailer will have a tendency to whip toward the outer side of the curve which can cause the motorcycle and trailer to both overturn.

When coming to a stop, another problem is encountered with prior art trailer connections. The motorcycle will tend to fall toward one side, while the trailer with two laterally spaced apart wheels does not. It is sometimes difficult for some motorcycle operators to keep the motorcycle from tipping to the side.

The two-wheel trailer hitch cart in accordance with this invention helps solve these prior art problems and improves stability as well as safety of operating motorcycles with trailers connected behind.

SUMMARY OF THE INVENTION

In accordance with the present invention, a two-wheel hitch cart is provided for connection to the rear of the motorcycle, and a trailer is then connected to the rear of the cart. The hitch cart has a U-shaped frame, consisting of a lateral frame member and two longitudinal frame members, one extending forwardly from each respective opposite end of the lateral frame member. A wheel mounting assembly is connected to the forward end of each of the longitudinal members and wheel rotatably mounted on each wheel mounting assembly.

The wheel mounting assemblies each include a compressive material type of rotational shock absorber comprising a laterally extending shaft received in the tubular cavity of a housing filled with a compressive material, such as rubber or a rubber-like substance, that is adhered tightly to both the shaft and the inner wall of the housing. The compressive material resiliently restrains the shaft from rotation within the housing, but when rotational pressure is applied it does permit limited rotation of the shaft against progressively increasing resistance the farther the shaft is rotated from its original position. When the pressure is released, the compressive material adhered to the shaft and inner wall of the housing rotates the shaft back to its original position. A crank or lever arm is affixed at one end to the projecting outer end of the shaft. The crank or lever arm extends from that affixed end to an aperture near its free end in which a bearing is secured to receive one end of an axle having a wheel mounted on the opposite end thereof One of these wheel mounting assemblies with its compressive material type of rotational shock absorber is provided on each of the longitudinal members at each opposite side of the two wheel cart.

As the wheels in contact with the road surface encounter bumps or depressions, the wheels move slightly up and down which causes the crank or lever arm of the shock absorbing assembly to put rotational pressure on the shaft that is being resiliently held from rotation by the adhered compressive material. Thus, the immediate harsh impact of a bump or depression is partially or wholly absorbed by the compressive material which is adhered to the shaft and inner wall of the housing.

A longitudinal connecting member extends forward from the mid-region of the lateral frame member for reception in the connecting sleeve at the rear of the motorcycle. A longitudinal tubular member extends rearward from the mid-region of the lateral frame member to receive in its tubular passageway the insert shaft of a ball-type trailer hitch, to which a trailer can then be connected.

When the two wheel cart in accordance with this invention is connected to the motorcycle, the wheel mounting assemblies at the forward end region of each of the longitudinal frame members are positioned adjacent the rear wheel of the motorcycle and outboard from each opposite side thereof.

DESCRIPTION OF PREFERRED EMBODIMENT

A trailer hitch cart for a motorcycle in accordance with this invention comprises a two-wheel cart 2 that is first connected to the trailer connecting bracket 4 at the rear of a motorcycle 6, and a trailer 8 is then connected to the hitch bracket 10 of the cart 2. The cart 2 stabilizes the motorcycle when a trailer is pulled behind.

The trailer hitch cart 2 includes a U-shaped frame 11 having a lateral member 12 across the rear, a first longitudinal member 14 extending forwardly from one end 16 of the lateral member 12, and a second longitudinal member 18 extending forwardly from the other end 20 of the lateral member 12.

A first wheel mounting assembly 22 is secured to the forward end region 24 of the first longitudinal member 14. A second wheel mounting assembly 26 is secured to the forward end region 28 of the second longitudinal member 18. The forward end regions 24 and 28 angle downwardly at about a forty-five degree angle to the respective rearward regions 30 and 32 of the respective longitudinal members 14 and 18, terminating at respective free ends 34 and 36.

Figure 9:
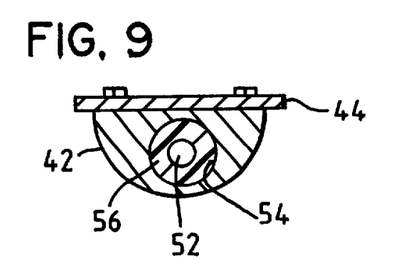
FIG. 9 is a section view taken on line 9—9 of FIG. 10.
Figures 10, 11:
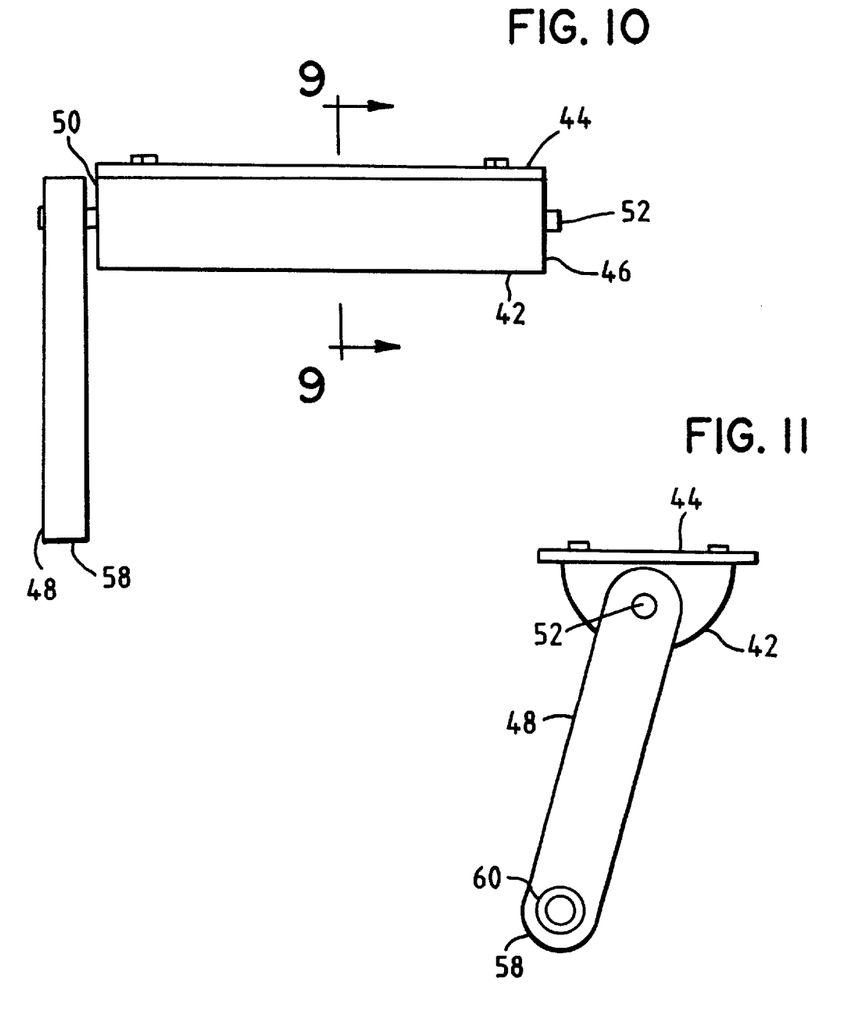
FIG. 10 is an end elevation view of one of the shock absorber assemblies used on the trailer hitch cart in accordance with the present invention.
FIG. 11 is a side elevation view of the shock absorber assembly seen in FIG. 10

Each wheel mounting assembly includes a base plate 38 welded to the downwardly facing surface 40 of the respective forward end regions 24 and 28 of the longitudinal members 14 and 18. A tubular shock absorbing member 42 is secured to the undersurface 44 of each base plate 38, and extends laterally thereof having an inwardly facing free end 46. A shock absorbing arm or crank 48 is fixedly connected at the opposite outwardly facing end 50 to a partially rotatable shaft 52 projecting outwardly from the outwardly facing end 50 of the shock absorbing member 42. The shock absorbing members 42 each have a tubular cavity 54 extending inwardly from the outwardly facing end 50. The shaft 52 extends into this tubular cavity 54 and is secured therein by a rubber like compressive material 56 which fills the remaining portion of the cavity and is adhered to the shaft 52 as well as to the inner surface of the tubular cavity 54. The compressive material 56 adhered to the shaft 52 is sufficiently resilient to enable the shaft 52 to rotate under rotational pressure through a limited arc of between zero degrees and about sixty degrees, with increasing resistance against rotation as it approaches the sixty degree limit. When rotational pressure is released, the compressive material 56 rotates the shaft 52 back to its original position at the original zero degree starting point.

The shock absorbing arm or crank 48 extends for a short distance in a downward direction from its fixed connection to the shaft 52 to terminate in a free end 58. An aperture is formed at the free end to receive a bearing 60 therein having a central bore to receive the inwardly projecting end 62 of a short axle 64 on whose opposite outer end 66 a wheel 68 is rotatably mounted. Thus, each forward end region 24 and 28 on opposite sides of the U-shaped frame 11 has a wheel mounting assembly 26 connected thereto and a wheel 68 rotatably mounted on each wheel mounting assembly.

As the wheels in contact with the road surface encounter bumps or depressions, the wheels move slightly up and down which causes the crank or lever arm 48 of the shock absorbing assembly to put rotational pressure on the shaft 52 that is being resiliently held from rotation by the adhered compressive material. Thus, the immediate harsh impact of a bump or depression is partially or wholly absorbed by the compressive material which is adhered to the shaft and inner wall of the housing.

Figure 8:
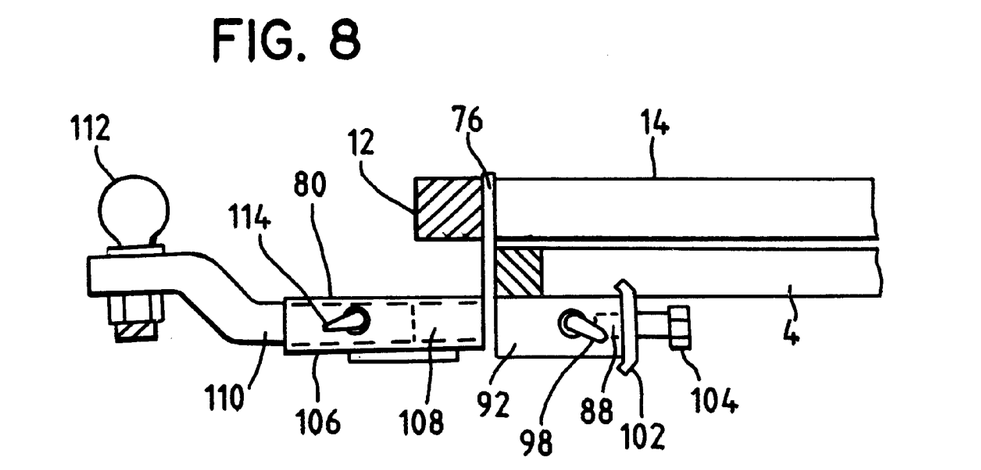
FIG. 8 is an enlarged elevation view of the hitching assembly that connects the trailer hitch cart to the motorcycle and to the ball hitch assembly to which a trailer is ultimately connected, with portions of the motorcycle connecting frame and of the trailer hitch cart frame in section.

A coupling assembly 70 is secured to the lateral member 12 of the U-shaped frame 11 for releasably connecting the cart 2 to the motorcycle 6 at the forwardly facing end 72 of the coupling assembly 70, and for releasably connecting a trailer 8 at the rearwardly facing end 74 of the coupling assembly 70. The coupling assembly 70 includes a mounting plate 76 bolted to the forwardly facing side wall 78 of the lateral member 12 of the U-shaped frame 11. An angular cross-section tubular member 80 is positioned to extend longitudinally of the lateral member 12 and mounting plate 76 to which it is welded at the lower end 82 of the mounting plate 76.

Figure 7:
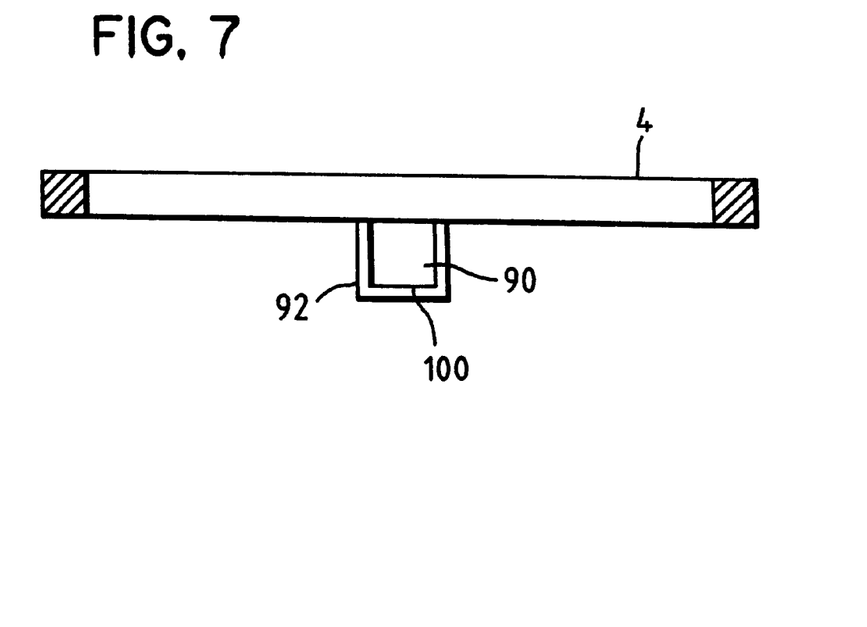
FIG. 7 is an enlarged section view of the rear portion of the motorcycle connecting frame and bracket looking rearward.

The tubular member 80 has a substantially square cross section. It has a forward section 84 which extends forwardly of the mounting plate 76 and lateral member 12 a short distance and terminates in a free end 86 having a threaded bore 88 opening into the cavity of the tubular member 80. The forward section 84 is received into and through the square cross-sectional passageway 90 of the tubular connecting member 92 at the rear of the motorcycle 6. When received therein, the apertures 94 through the side walls 96 of the forward section 84 come into registration with corresponding apertures through the side walls of the tubular connecting member 92 of the motorcycle, and a securing pin 98 is extended through the aligned apertures to hold the forward section 84 of the tubular member 80 within the passageway 90 of the motorcycle connecting member 92. At such time, the free end 86 of the forward section 84 is inward a short distance from the open free end 100 of the motorcycle connecting member 92. A clamping plate 102 having an aperture and bolt 104 therethrough is positioned over the free end 100 of the motorcycle connecting member 92, and the bolt is threaded into the threaded bore 88 opening into the cavity of the tubular member 80. When the bolt is tightened, the clamping plate 102 is drawn up in tight clamping engagement against the free end 100 of the motorcycle connecting member 92 to hold the forward section 84 of the tubular member 80 securely connected to the motorcycle 6.

The tubular member 80 also has a rearwardly extending section 106 of square cross-section and a cavity 108 therein of square cross-section. The square cross-section shaft 110 of a ball-hitch member 112 is received in the square cross-section cavity 108. The rearwardly extending section 106 of the tubular member 80 has apertures through the side walls which come into registration with corresponding apertures through the side walls of the shaft 110 of the ball-hitch member 112. A securing pin 114 is received through the aligned apertures to secure the ball-hitch member 112 to the rearwardly extending section 106 of the tubular member 80.

Figure 1:
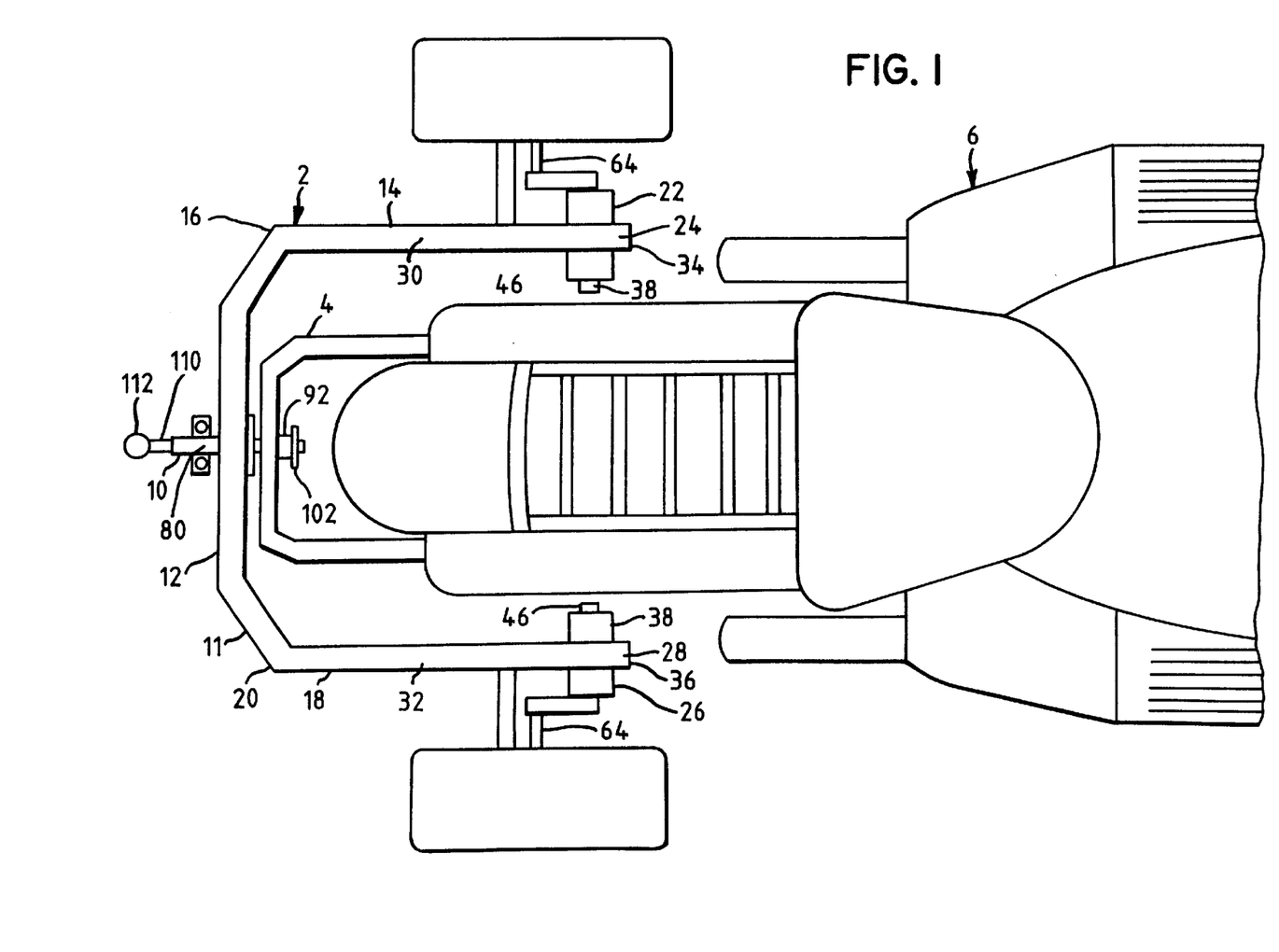
FIG. 1 is a plan view from above of a trailer hitch cart in accordance with the invention connected to a motorcycle but before being drawn up snug for a rigid stable connection to more clearly show the relationship of the connecting components.
Figure 2:
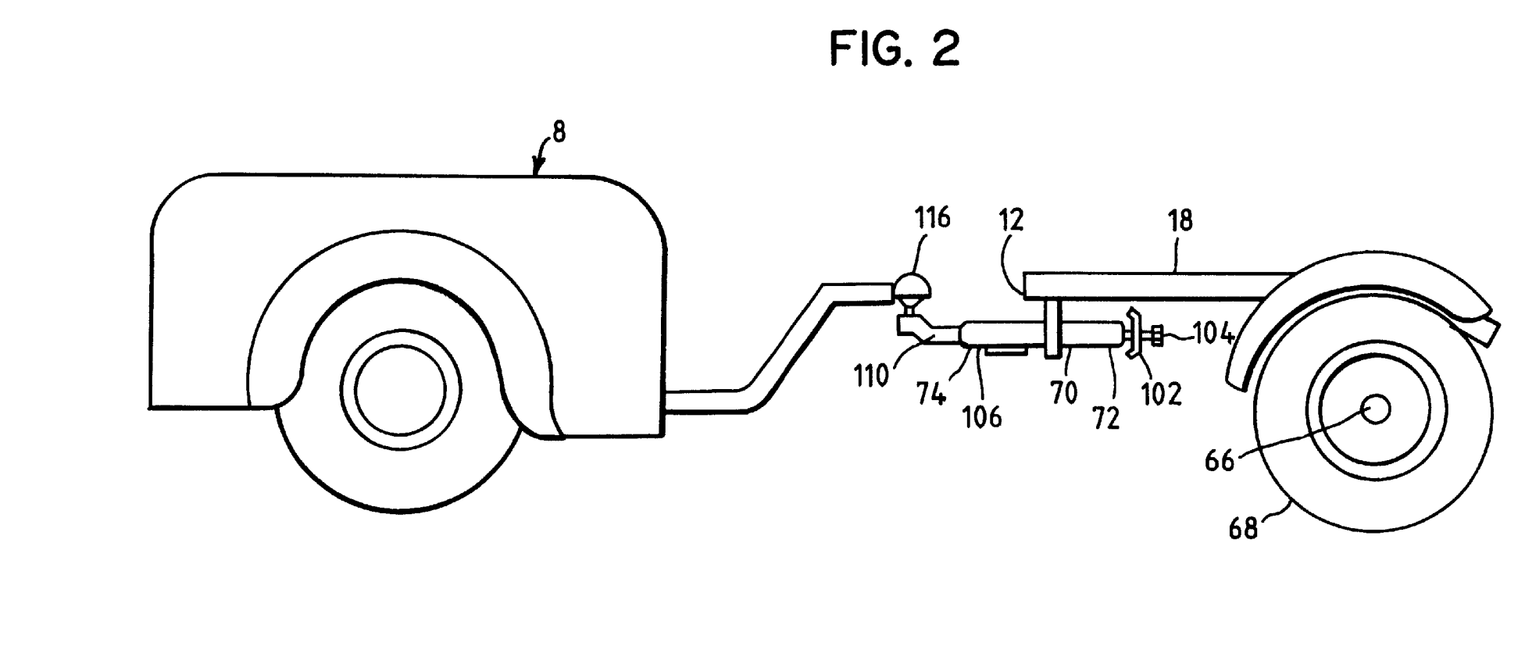
FIG. 2 is an elevation view of the trailer hitch cart in accordance with the invention shown with a trailer connected thereto.
Figure 3:
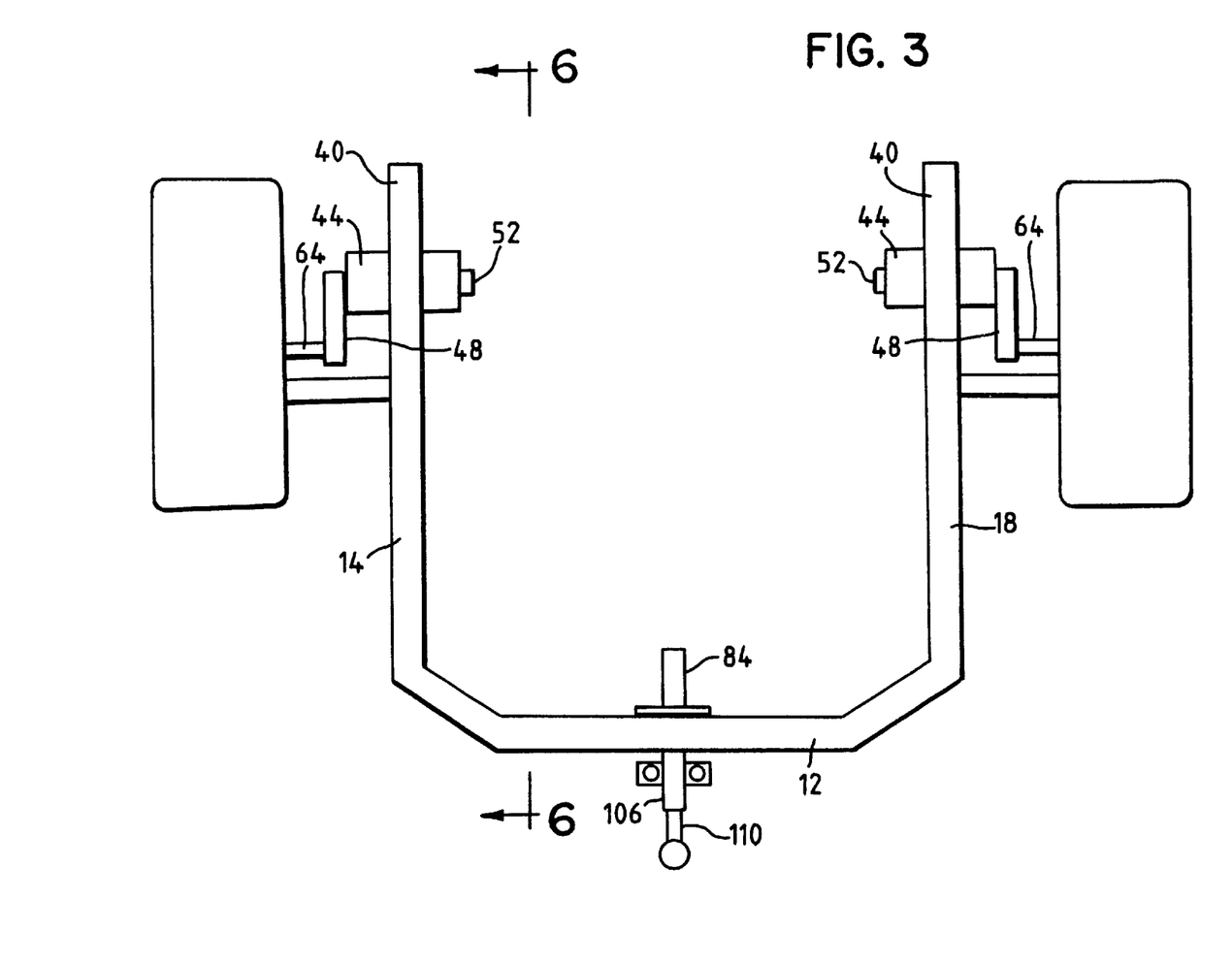
FIG. 3 is a plan view from above of a trailer hitch cart which is disconnected from both a motorcycle and a trailer.
Figure 4:
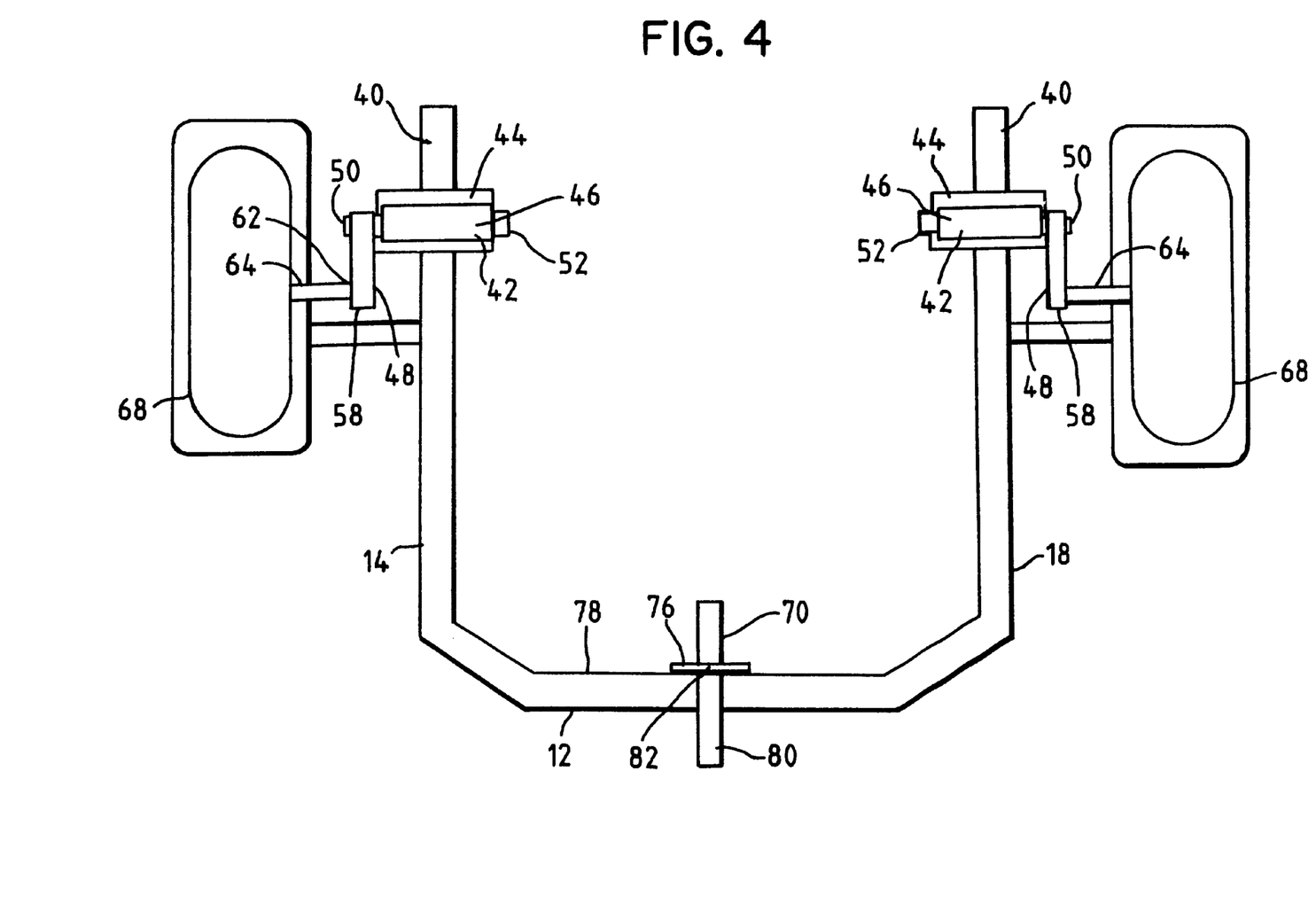
FIG. 4 is a plan view from below of the trailer hitch cart shown in FIG. 3.
Figure 5:
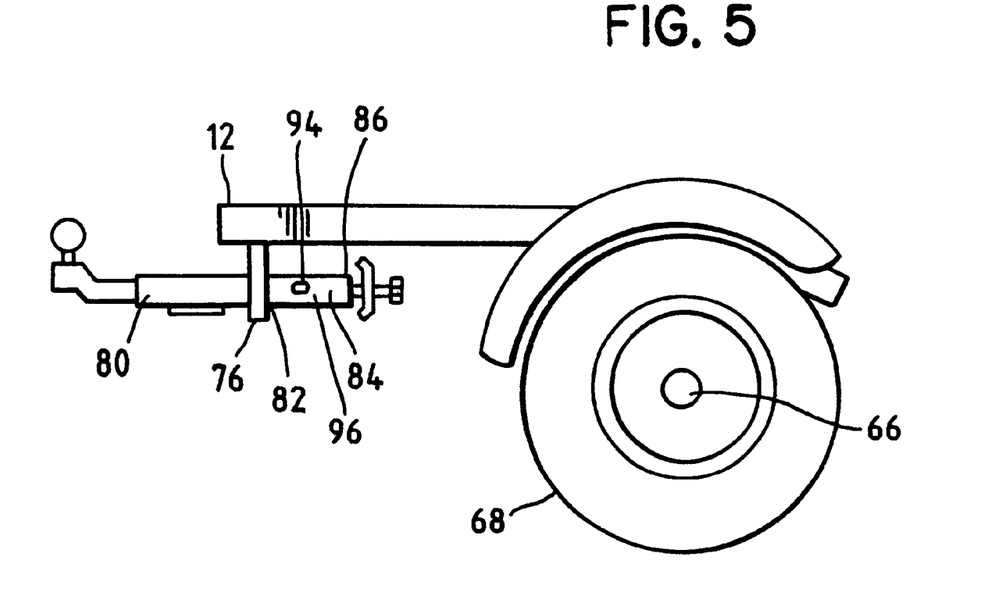
FIG. 5 is a side elevation view of a trailer hitch cart in accordance with this invention.
Figure 6:
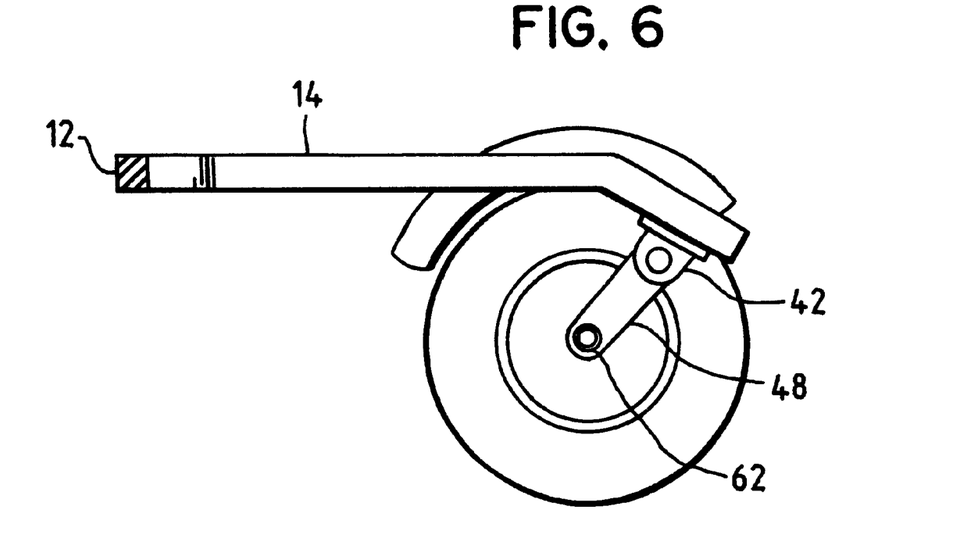
FIG. 6 is a section view taken on line 6—6 of FIG. 3.

A corresponding hitch 116 of the trailer 8 may then be connected to the ball-hitch member 112. The trailer 8 is thus connected to the motorcycle 6 by way of the trailer hitch cart 2 in accordance with this invention, which provides improved stability for both the motorcycle and trailer.

The wheels 68 of the trailer hitch cart 2 have a smaller diameter than the wheels of the motorcycle 6 as well as of the trailer 8.

I claim:

1. An apparatus for stabilizing and connecting a trailing item to a motorcycle, comprising:
   a two wheeled assembly for releasable attachment to a trailer connecting bracket with a tubular connecting member and for releasable attachment to the trailer item, the two wheeled assembly comprising:
      a frame member comprising:
         a laterally extending member,
         a first longitudinally extending member,
         a spaced apart second longitudinally extending member,
         a first releasable connecting member for releasably connecting the two wheel assembly to the trailer connecting bracket,
         a second releasable connecting member for releasable connecting the two wheel assembly to the trailing item wherein the first and second releasable connecting members are located on the laterally extending member of the frame member, a first wheel mounting assembly for rotatably mounting a wheel thereon connected to the first longitudinally extending member, and a second wheel mounting assembly for rotatably mounting a wheel thereon connected to the second longitudinally extending member, the wheel mounting assembly comprising a shock absorbing assembly wherein the shock absorbing assembly allows the two wheel assembly to absorb road imperfections while maintaining the stability of the motorcycle and the trailing vehicle.

2. The apparatus for stabilizing and connecting a trailing item to a motorcycle of claim 1, the shock absorbing assembly comprising:

a housing, a shaft extending in the housing, and a compressive material adhered to the shaft and the housing to resiliently restrain the shaft from rotation within the housing.

3. The apparatus for stabilizing and connecting a trailing item to a motorcycle of claim 1, the shock absorbing assembly comprising:

a housing, a shaft extending in the housing, a compressive material adhered to the shaft and the housing to resiliently restrain the shaft from rotation within the housing, and an arm having a first end rigidly secured to one end of the shaft for limited rotational movement of the shaft within the housing when pressure in the rotational direction is applied to the arm, wherein the compressive material adhered to the shaft and the housing rotates the shaft back to its original position when the pressure is released, wherein the arm extends from the first end to a wheel mounting portion, and wherein the wheel is rotatably connected to the wheel mounting portion of the arm.

4. The apparatus for stabilizing and connecting a trailing item to a motorcycle of claim 1, the first releasable connecting member comprising a tubular longitudinal member for reception in a sleeve connecting member.

5. The apparatus for stabilizing and connecting a trailing item to a motorcycle of claim 4, the first and second releasable connecting member comprising a longitudinal member for reception in a sleeve connecting member, the longitudinal member of the first releasable connecting member extending forwardly of the laterally extending member and terminating at a free end, the longitudinal member at the free end having a threaded bore extending inward, a clamping member having an aperture therethrough, and a bolt to extend through the aperture of the clamping member for threaded reception of the bolt in the threaded bore.

6. The apparatus for stabilizing and connecting a trailing item to a motorcycle of claim 5, wherein the releasable connecting member includes a longitudinal member for reception in a sleeve connecting member of a motorcycle, the longitudinal member of the first releasable connecting member extending forwardly of the laterally extending member and terminating at a free end, a threaded bore extending inwardly of the longitudinal member at the free end, a clamping member having an aperture therethrough, a bolt to extend through the aperture of sail clamping member for threaded reception of the bolt in the threaded bore, a pin receiving passageway extending laterally through the longitudinal member, and a securing pin to extend through the pin receiving passageway.

7. The apparatus for stabilizing and connecting a trailing item to a motorcycle of claim 6, further wherein the second releasable connecting member including a tubular longitudinal member having a tubular passageway therein for reception of the corresponding shaft of a trailer hitch assembly therein.

8. The apparatus for stabilizing and connecting a trailing item to a motorcycle of claim 1, wherein the first releasable connecting member includes a longitudinal member for reception in a sleeve connecting member of a motorcycle, the longitudinal member of the first releasable connecting member extending forwardly of the laterally extending member and terminating at a free end, a threaded bore extending inwardly of the longitudinal member at the free end, a clamping member having an aperture therethrough, a bolt to extend through the aperture of the clamping member for threaded reception of the bolt in the threaded bore, a first pin receiving passageway extending laterally through the longitudinal member, and a first securing pin to extend through the first pin receiving passageway, the second releasable connecting member including a tubular longitudinal member having a tubular passageway therein for reception of the corresponding shaft of a trailer hitch assembly therein, a second pin receiving passageway extending laterally through the tubular longitudinal member, and a second securing pin to extend through the second pin receiving passageway, the longitudinal member of the first releasable connecting member and the tubular longitudinal member of the second releasable connecting member being axially aligned.

* * * * *